United States Patent
Sailer et al.

(10) Patent No.: US 12,309,165 B2
(45) Date of Patent: May 20, 2025

(54) COMPLIANCE AGGREGATION

(71) Applicant: INTERNATIONAL BUSINESS MACHINES CORPORATION, Armonk, NY (US)

(72) Inventors: Anca Sailer, Scarsdale, NY (US); Ramamurthy Vaidhyanathan, Cupertino, CA (US); Nataraj Nagaratnam, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 650 days.

(21) Appl. No.: 17/544,431

(22) Filed: Dec. 7, 2021

(65) Prior Publication Data

US 2023/0176885 A1 Jun. 8, 2023

(51) Int. Cl.
H04L 29/06 (2006.01)
G06F 9/455 (2018.01)
H04L 9/40 (2022.01)
H04L 67/10 (2022.01)

(52) U.S. Cl.
CPC ........ H04L 63/107 (2013.01); G06F 9/45558 (2013.01); H04L 63/108 (2013.01); H04L 63/20 (2013.01); H04L 67/10 (2013.01); G06F 2009/45587 (2013.01); G06F 2009/45595 (2013.01)

(58) Field of Classification Search
None
See application file for complete search history.

(56) References Cited

U.S. PATENT DOCUMENTS

| | | | |
|---|---|---|---|
| 9,286,595 B2 | 3/2016 | Taneja et al. | |
| 9,444,820 B2 | 9/2016 | Muppidi et al. | |
| 9,460,169 B2 | 10/2016 | Hinton et al. | |
| 9,692,792 B2 * | 6/2017 | Lang | H04L 63/0263 |
| 10,021,138 B2 | 7/2018 | Gill et al. | |
| 10,079,859 B2 | 9/2018 | Lang et al. | |
| 10,212,190 B2 * | 2/2019 | Nagaratnam | G06F 21/62 |
| 10,558,809 B1 | 2/2020 | Joyce et al. | |
| 2012/0005051 A1 | 1/2012 | Deng et al. | |
| 2014/0222521 A1 | 8/2014 | Chait | |
| 2017/0171020 A1 | 6/2017 | Wei et al. | |
| 2019/0149420 A1 | 5/2019 | Levy et al. | |
| 2020/0082117 A1 * | 3/2020 | Simmons | H04L 63/105 |

OTHER PUBLICATIONS

Mell et al., "The NIST Definition of Cloud Computing", NIST, Special Publication 800-145, Sep. 2011, 7 pages.

* cited by examiner

*Primary Examiner* — Andrew J Steinle
(74) *Attorney, Agent, or Firm* — Gavin Giraud; Andrew D. Wright; Calderon Safran & Wright P.C.

(57) ABSTRACT

A method includes receiving, by a computing device, security definitions from an owner of a cloud deployment; receiving, by the computing device, a customer profile having intents to use the cloud deployment; assessing, by the computing device and using automated assessment tools, compliance of the cloud deployment with the security definitions in view of the intents; generating, by the computing device, a compliance posture using the assessment; and providing, by the computing device, the compliance posture to a reviewer.

20 Claims, 5 Drawing Sheets

COMPLIANCE AGGREGATION

BACKGROUND

Aspects of the present invention relate generally to enterprise compliance and, more particularly, to compliance aggregation.

Hybrid cloud deployments extend across several types of cloud form factors, e.g., Infrastructure as a Service (IaaS), Platform as a Service (PaaS), etc., and technology platforms.

SUMMARY

In a first aspect of the invention, there is a computer-implemented method including: receiving, by a computing device, security definitions from an owner of a cloud deployment; receiving, by the computing device, a customer profile having intents to use the cloud deployment; assessing, by the computing device and using automated assessment tools, compliance of the cloud deployment with the security definitions in view of the intents; generating, by the computing device, a compliance posture using the assessment; and providing, by the computing device, the compliance posture to a reviewer.

In another aspect of the invention, there is a computer program product including one or more computer readable storage media having program instructions collectively stored on the one or more computer readable storage media. The program instructions are executable to: receive security definitions from an owner of a cloud deployment; receive a customer profile having intents to use the cloud deployment; use assessment tools to assess compliance of the cloud deployment with the security definitions in view of the intents; generate a compliance posture using the assessment; provide the compliance posture to a reviewer; and receive a remediation recommendation from the reviewer.

In another aspect of the invention, there is system including a processor, a computer readable memory, one or more computer readable storage media, and program instructions collectively stored on the one or more computer readable storage media. The program instructions are executable to: receive security definitions from an owner of a cloud deployment; receive a customer profile having intents to use the cloud deployment; use assessment tools to assess compliance of the cloud deployment with the security definitions in view of the intents; generate a compliance posture using the assessment; provide the compliance posture to a reviewer; receive a remediation recommendation from the reviewer; and cause an assessment tool to perform the recommended remediation.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Figure 1:
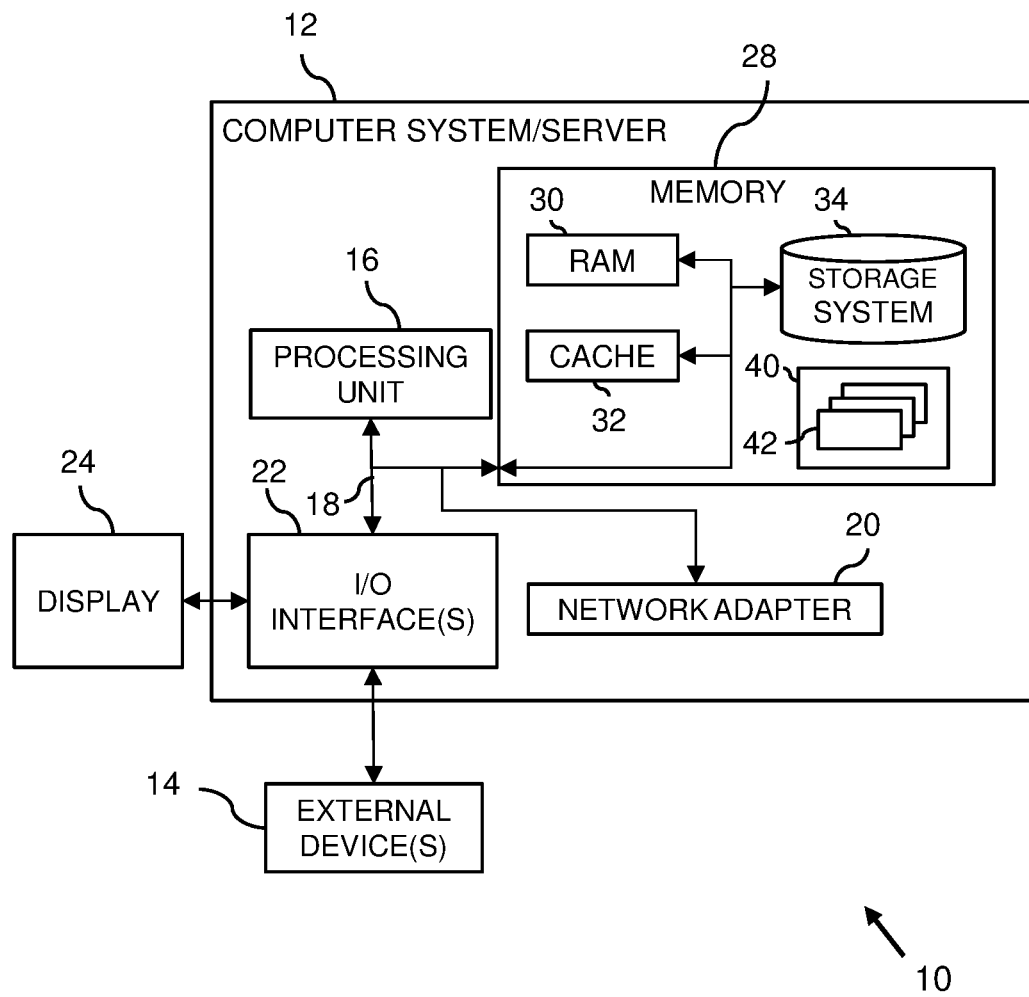
FIG. 1 depicts a cloud computing node according to an embodiment of the present invention.

Aspects of the present invention relate generally to enterprise compliance and, more particularly, to compliance aggregation. According to aspects of the invention, a system aggregates compliance postures in a cloud deployment environment. In embodiments, the system establishes a continuous compliance exchange protocol between an aggregation system and various sources of compliance validation. In this manner, implementations of the invention provide an integrated view of compliance posture across various systems and domains cloud deployment environment.

In embodiments, there is a system for aggregating compliance validation/assessment information in a cloud deployment environment, comprising a Compliance Aggregation Point (CAP) configured to interact with a plurality of Policy Validation Points (PVPs) to collect aggregated compliance posture. In embodiments, each PVP registers with the CAP. In embodiments, the system provides a registration, which includes metadata about the CAP so that when needed, the CAP can contact that PVP. Examples of such metadata includes a Uniform Resource Locator (URL), and credentials to use (e.g., API keys) to connect to. In embodiments, the CAP dynamically selects the appropriate PVP based on policies e.g., for a container the system selects a specific vendor, for Continues Integration/Continuous Delivery (CI/CD) policies it will another vendor, etc.

Implementations of the invention provide a practical application of identifying compliance posture of a hybrid cloud deployment. In embodiments, aspects of the invention: a) receive security definitions from an owner of a cloud deployment; b) receive a customer profile having intents to use the cloud deployment; c) use assessment tools to assess compliance of the cloud deployment with the security definitions in view of the intents; d) generate a compliance posture using the assessments; e) provide the compliance posture to a reviewer; f) receive a remediation recommendation from the reviewer; and g) cause an assessment tool to perform the recommended remediation. This combination of steps is unconventional steps and allows for the identification of a compliance posture of a hybrid-cloud deployment.

It should be understood that, to the extent implementations of the invention collect, store, or employ personal information provided by, or obtained from, individuals (for example, customer profile), such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
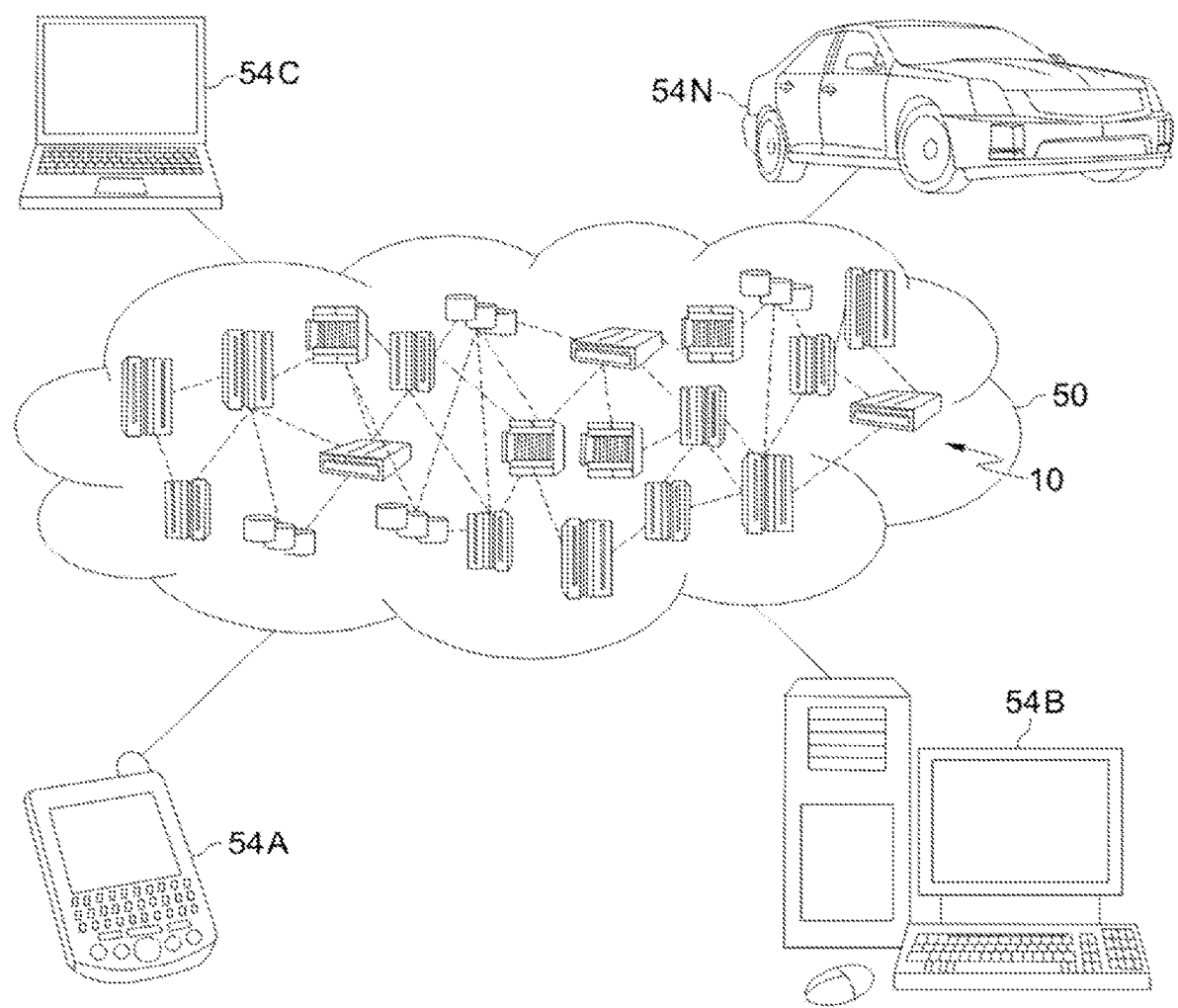
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
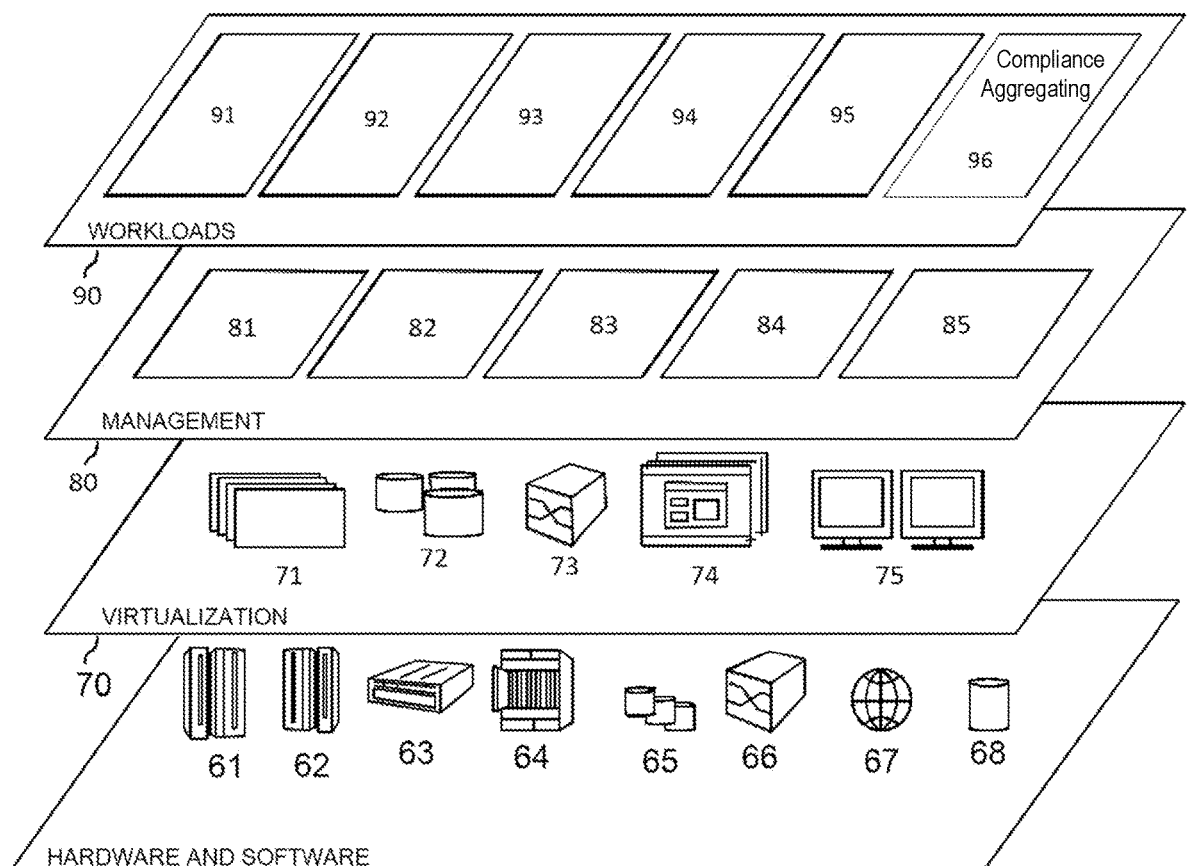
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and compliance aggregating 96.

Implementations of the invention may include a computer system/server 12 of FIG. 1 in which one or more of the program modules 42 are configured to perform (or cause the computer system/server 12 to perform) one of more functions of the compliance aggregating 96 of FIG. 3. For example, the one or more of the program modules 42 may be configured to: a) receive security definitions from an owner of a cloud deployment; b) receive a customer profile having intents to use the cloud deployment; c) use assessment tools to assess compliance of the cloud deployment with the security definitions in view of the intents; d) generate a compliance posture using the assessments; e) provide the compliance posture to a reviewer; f) receive a remediation recommendation from the reviewer; and g) cause an assessment tool to perform the recommended remediation.

Figure 4:
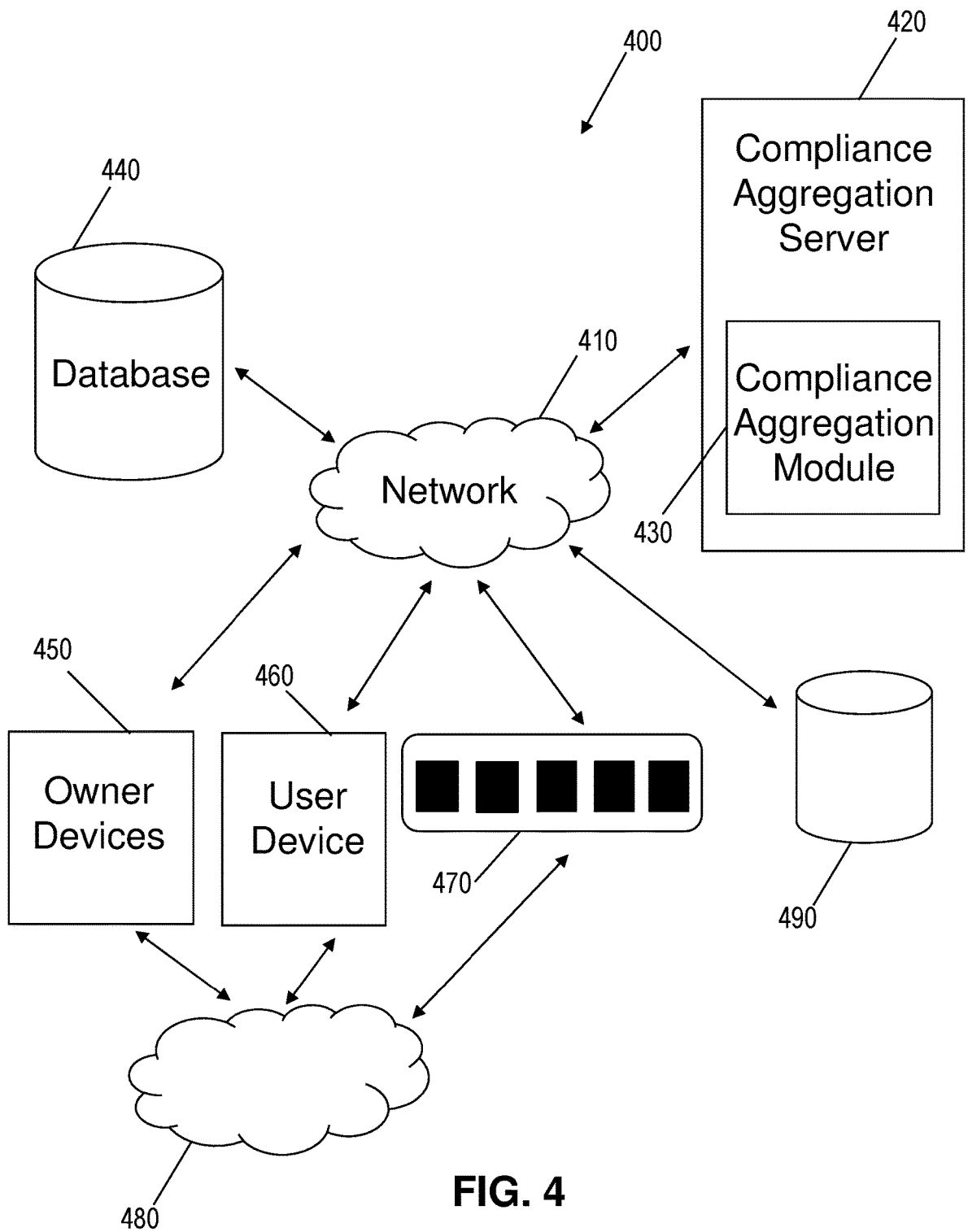
FIG. 4 shows a block diagram of an exemplary environment in accordance with aspects of the invention.

FIG. 4 shows a block diagram of an exemplary environment 400 in accordance with aspects of the invention. In embodiments, the environment 400 includes a network 410, a compliance aggregation server 420, a database 440, owner devices 450, a user device 460, assessment tools 470, and a hybrid cloud deployment 480. In embodiments, the network 410 is any suitable network including any combination of one or more of a LAN, WAN, or the Internet. In a particular embodiment, the network 410 is representative of a cloud computing environment 50 as described in FIG. 2. The compliance aggregation server 420 is a computing device comprising one or more components of computer system/server 12 of FIG. 1.

In embodiments, the owner devices 450 include servers for hosting the hybrid cloud deployment 480. In one example, the hybrid cloud deployment 480 is a web-based shopping application. Other types of hybrid cloud deployment may be used in implementations. In embodiments, the user device 460 is a desktop computer, a laptop computer, a tablet, a smartphone, amongst other examples, comprising one or more components of computer system/server 12 of FIG. 1. In embodiments, a user utilizes the user device 460 to interact with the hybrid cloud deployment 480, e.g., shop on the web-based shopping application. In embodiments, the assessment tools 470 are software tools (e.g., automated assessment tools) which verify compliance with a security standard for a specific portion of the hybrid cloud deployment 480. In this way, the assessment tools 470 validate compliance to a security standard. In embodiments, each assessment tool of the assessment tools 470 focuses on a separate technology or lifecycle. Examples of assessment tools 470 include ToolChain, Auditree, and Caveonix, amongst other tools. In embodiments, the security standards include National Institute of Standards and Technology (NIST), Payment Card Industry (PCI), and International Organization for Standardization (ISO), amongst other security examples. In embodiments, the reviewer 490 is an information professional which reviews the hybrid cloud deployment 480 for compliance with security standards.

In embodiments, the compliance aggregation server 420 comprises a compliance aggregation module 430, which may comprise one or more program modules such as program modules 42 described with respect to FIG. 1. The compliance aggregation server 420 may include additional or fewer modules than those shown in FIG. 4. In embodiments, separate modules may be integrated into a single module. Additionally, or alternatively, a single module may be implemented as multiple modules. Moreover, the quantity of devices and/or networks in the environment 400 is not limited to what is shown in FIG. 4. In practice, the environment 400 may include additional devices and/or networks; fewer devices and/or networks; different devices and/or networks; or differently arranged devices and/or networks than illustrated in FIG. 4.

In embodiments, an enterprise desires an aggregate view of compliance in the hybrid cloud deployment 480. However, multiple components each perform a portion of an overall compliance check. As an example, a vendor may supply a tool that only checks for a compliance posture of an operating system of a server of the owner devices 450. In this way, a compliance reviewer is left with a challenge of aggregating compliance information from disparate sources and aggregating them from different formats, standards, and levels of audit readiness, amongst other issues.

In embodiments, the compliance aggregation module 430 aggregates the compliance information and acts as a single command center which orchestrates the assessment of compliance and remediation of compliance issues across a variety of assessment tools. In embodiments, the compliance aggregation module 430 aggregates the compliance information by receiving security definitions from an owner of the hybrid cloud deployment 480. In embodiments, an owner of the owner devices 450 defines which security standard the hybrid cloud deployment 480 adheres to. As an example, the owner defines the security standard as NIST, PCI, and/or ISO. In embodiments, the security definitions include properties, checks, and policy parameters for the security definitions. As an example of a policy parameter, the security definition includes which version of the security standard, e.g., NIST 800-53, PCI 3.x, ISO 27001, etc. In embodiments, the compliance aggregation module 430 receives the security definitions from the owner devices 450 through the network 410.

In embodiments, in response to receiving the security definitions from the owner devices 450 of the hybrid cloud deployment 480, the compliance aggregation module 430 receives an intent from a user of the user device 460. In embodiments, the user generates a customer profile using the user device 460. In embodiments, the customer profile includes intents the user has for using the hybrid cloud deployment 480 and policies and parameters for those intents. In embodiments, an intent represents features of the hybrid cloud deployment 480 that the user intends to utilize. As an example, the user is a consumer and the hybrid cloud deployment 480 is an online shopping application. In this example, the user enters their shipping information in their customer profile as one form of intent. As another example, the user enters their payment information in their customer profile as another form of intent. In embodiments, the user has multiple customer profiles for different services from the hybrid cloud deployment 480, with each customer profile having multiple intents. In embodiments, the customer profile is in the form of Open Security Controls Assessment Language (OSCAL). In embodiments, OSCAL is available as JavaScript Object Notation (JSON), Yet Another Markup Language (YAML), and Extensible Markup Language (XML).

In embodiments, the policies in the customer profile represent which assessment tool of the assessment tools 470 should perform the compliance check. As an example, a policy instructs the compliance aggregation module 430 to use an assessment tool which checks for compliance to the PCI security standard for the payment information intent. In embodiments, the parameters include when the compliance aggregation module 430 performs the compliance check. As an example, the parameter instructs the compliance aggregation module 430 to check for compliance based on a set schedule. In embodiments, the parameters define the scope of the compliance check and a frequency for the compliance check. As an example, the parameter instructs the compliance aggregation module 430 to not check for a specific intent. In this way, the user is able to specify the scope, profile and schedule for the compliance checks of the intents.

In embodiments, in response to receiving an intent from the user, the compliance aggregation module 430 uses the assessment tools 470 to check for compliance with the security definitions for those portions of the hybrid cloud deployment 480 the intent utilizes. As an example, the user's intent includes their payment information. In response to being payment information and the security definition from the owner including the PCI security standard, the compliance aggregation module 430 uses an assessment tool which checks for compliance with the PCI security standard in view of the policy from the customer profile. In this way, each intent represents a specific task and is given to the assessment tool of the assessment tools 470 that performs this task. As an example, the ToolChain assessment tool of the assessment tools 470 checks for encryption compliance with the PCI security standard. In embodiments, the compliance aggregation module 430 checks the intent based on the schedule in the parameters of the customer profile.

In embodiments, the compliance aggregation module 430 receives a compliance notification from the assessment tool of the assessment tools 470 in response to assessment tool determining that the hybrid cloud deployment 480 complies with the security definition for that portion of the security standard. Alternatively, if assessment tool determines that the hybrid cloud deployment 480 does not comply with the security definition, the compliance aggregation module 430 receives a noncompliance notification from the assessment tool of the assessment tools 470. In embodiments, the compliance aggregation module 430 uses an assessment tool of the assessment tools 470 to check compliance for each of the intents. In embodiments, the compliance aggregation module 430 uses an application programming interface (API) to use each assessment tool.

In embodiments, the compliance aggregation module 430 generates a compliance posture using the assessments from the assessment tools 470. In embodiments, a compliance posture is a report which indicates whether the hybrid cloud deployment 480 complies with the security definitions or does not comply with the security definitions for that intent. In embodiments, the compliance aggregation module 430 summarizes the compliance posture using the assessments. In embodiments, the summary includes computer language syntax which indicates whether the hybrid cloud deployment 480 complies with the security definition or whether the hybrid cloud deployment 480 does not comply with the security definition. In further embodiments, the syntax includes a resource ID, a test performed, a result along with metadata of the assessment tool and a customer profile ID, amongst other information. In embodiments, the metadata includes an identification of which assessment tool did the compliance check, and a validation date and time of the compliance check. In embodiments, the syntax is in a computer language form of JSON, YAML, and/or XML. In embodiments, the compliance aggregation module 430 translates the computer language syntax into a native language for reading by the reviewer 490, e.g., English. In embodiments, to translate the syntax into the native language, the compliance aggregation module 430 uses Natural Language Processing (NLP).

In embodiments, the compliance aggregation module 430 provides the compliance posture to an reviewer 490. In embodiments, the reviewer 490 reviews the compliance posture to determine whether the overall infrastructure supporting the hybrid cloud deployment 480 meets the requirements laid down by regulators of the security standards. In embodiments, the compliance aggregation module 430 provides the compliance posture to the reviewer through the network 410.

In embodiments, the compliance aggregation module 430 receives remediation recommendations to remediate portions of the hybrid cloud deployment 480 which do not comply with the security definitions. In embodiments, the compliance aggregation module 430 receives the remediation recommendations through the network 410. In embodiments, in response to receiving the remediation recommendations, the compliance aggregation module 430 uses the metadata from the compliance posture to determine which assessment tool of the assessment tools 470 did the compliance check. In embodiments, the metadata is digital data and the compliance aggregation module 430 reads the metadata using machine learning techniques, e.g., NLP. In response to determining the assessment tool, the compliance aggregation module 430 causes that assessment tool to perform the remediation.

Figure 5:
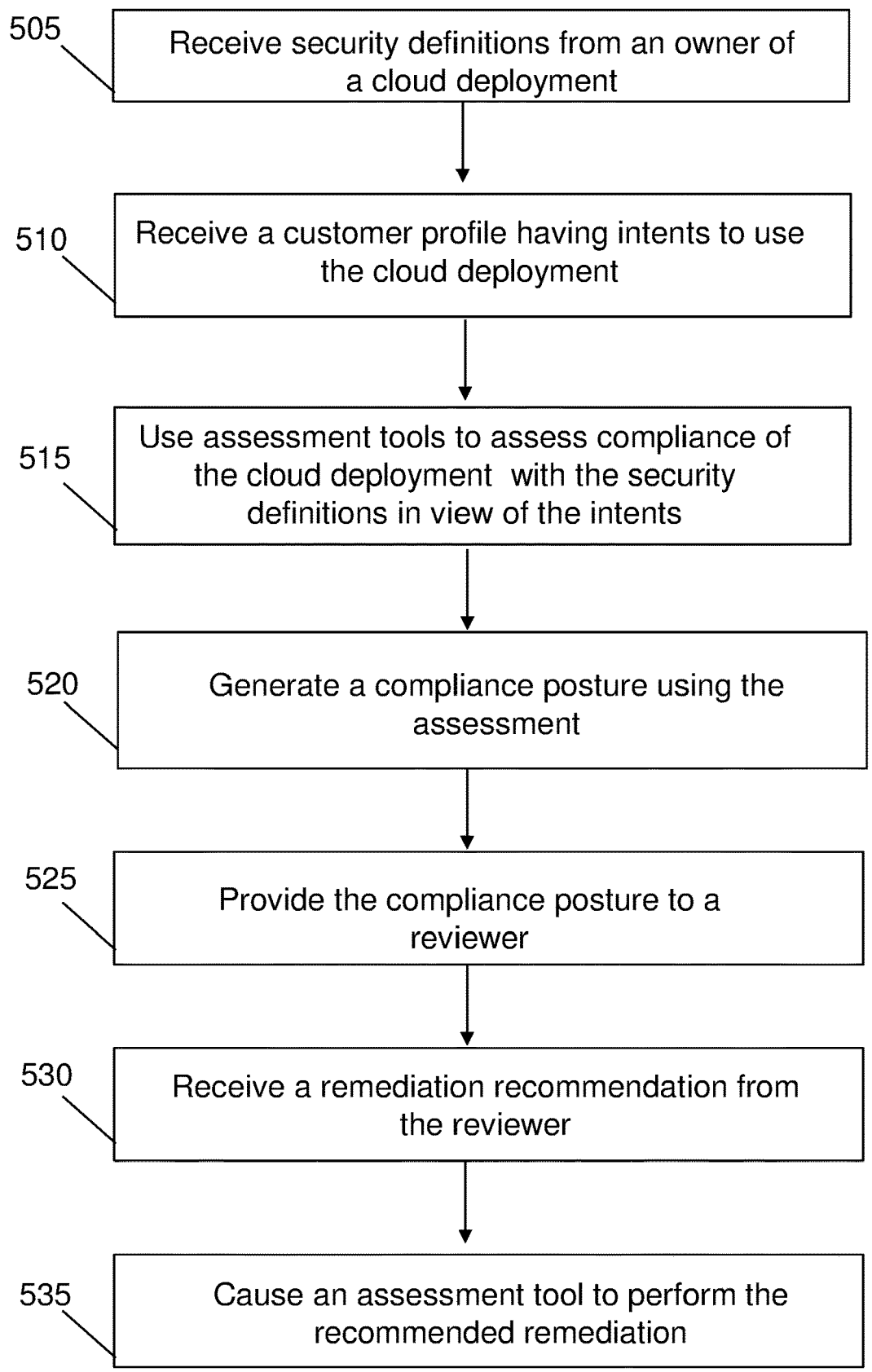
FIG. 5 shows a flowchart of an exemplary method in accordance with aspects of the invention.

FIG. 5 shows a flowchart of an exemplary method in accordance with aspects of the present invention. Steps of the method may be carried out in the environment of FIG. 4 and are described with reference to elements depicted in FIG. 4.

At step 505, the system receives security definitions from an owner of a cloud deployment. In embodiments, and as described with respect to FIG. 4, the compliance aggregation module 430 receives the security definitions from the owner devices 450 through the network 410. In embodiments, the security definitions include properties, checks, and policy parameters for the security definitions.

At step 510, the system receives a customer profile having intents to use the cloud deployment. In embodiments, and as described with respect to FIG. 4, the compliance aggregation module 430 receives the customer profile from the user device 460 through the network 410. In embodiments, an intent represents features of the hybrid cloud deployment 480 that the user intends to utilize.

At step 515, the system uses assessment tools to assess compliance with the security definitions in view of the intents. In embodiments, and as described with respect to FIG. 4, the compliance aggregation module 430 assess compliance by using an automated assessment tool of the assessment tools 470. In embodiments, the compliance aggregation module 430 uses an application programming interface (API) to use each assessment tool.

At step 520, the system generates a compliance posture using the assessment. In embodiments, and as described with respect to FIG. 4, the compliance aggregation module 430 summarizes all the assessments together. In embodiments, the summary in the compliance posture includes syntax which states whether there the intent complies with the security definition or whether the intent does not comply with the security definition.

At step 525, the system provides the compliance posture to a reviewer. In embodiments, and as described with respect to FIG. 4, the compliance aggregation module 430 provides the compliance posture to a reviewer 490 through the network 410.

At step 530, the system receives a remediation recommendation from the reviewer. In embodiments, and as described with respect to FIG. 4, the compliance aggregation module 430 receives the remediation from the reviewer 490 through the network 410.

At step 535, the system causes an assessment tool to perform the recommended remediation. In embodiments, and as described with respect to FIG. 4, the compliance aggregation module 430 uses the metadata to determine which assessment tool of the assessment tools 470 did the compliance check. In response to determining the assessment tool, the compliance aggregation module 430 causes that assessment tool to perform the remediation.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
    receiving, by a computing device, security definitions from an owner of a cloud deployment;
    receiving, by the computing device, a customer profile having intents to use the cloud deployment;
    assessing, by the computing device and using automated assessment tools, compliance of the cloud deployment with the security definitions in view of the intents;
    generating, by the computing device, a compliance posture using the assessment; and
    providing, by the computing device, the compliance posture to a reviewer.

2. The method of claim 1, wherein the security definitions include security standards.

3. The method of claim 2, wherein the security standards are selected from the group consisting of National Institute of Standards and Technology (NIST), Payment Card Industry (PCI), and International Organization for Standardization (ISO).

4. The method of claim 1, further comprising translating syntax in the compliance posture to a native language of the reviewer.

5. The method of claim 1, wherein the compliance posture includes syntax indicating a resource ID, a test performed, and a result of the compliance check along with metadata of the assessment tool.

6. The method of claim 1, wherein the compliance posture includes syntax selected from the group consisting of JavaScript Object Notation (JSON), Yet Another Markup Language (YAML), and Extensible Markup Language (XML).

7. The method of claim 1, wherein the customer profile is in the form of Open Security Controls Assessment Language (OSCAL).

8. The method of claim 1, further comprising receiving a remediation recommendation from the reviewer.

9. The method of claim 8, further comprising causing an assessment tool of the assessment tools to perform the recommended remediation.

10. The method of claim 9, further comprising using metadata from the compliance posture to determine the assessment tool to perform the recommended remediation.

11. The method of claim 9, wherein the metadata includes a validation date and time of the compliance check.

12. The method of claim 1, wherein the computing device includes software provided as a service in a cloud environment.

13. A computer program product comprising one or more computer readable storage media having program instructions collectively stored on the one or more computer readable storage media, the program instructions executable to:
    receive security definitions from an owner of a cloud deployment;
    receive a customer profile having intents to use the cloud deployment;
    use assessment tools to assess compliance of the cloud deployment with the security definitions in view of the intents;
    generate a compliance posture using the assessment;
    provide the compliance posture to a reviewer; and
    receive a remediation recommendation from the reviewer.

14. The computer program product of claim 13, wherein the intent includes payment information.

15. The computer program product of claim 13, wherein the compliance posture includes metadata to determine an assessment tool to perform the recommended remediation.

16. The computer program product of claim 13, wherein the compliance posture indicates whether the cloud deployment complies with the security definitions.

17. A system comprising:
    a processor, a computer readable memory, one or more computer readable storage media, and program instructions collectively stored on the one or more computer readable storage media, the program instructions executable to:
    receive security definitions from an owner of a cloud deployment;
    receive a customer profile having intents to use the cloud deployment;
    use assessment tools to assess compliance of the cloud deployment with the security definitions in view of the intents;
    generate a compliance posture using the assessment;
    provide the compliance posture to a reviewer;
    receive a remediation recommendation from the reviewer; and
    cause an assessment tool to perform the recommended remediation.

18. The system of claim 17, wherein the security definitions are selected from the group consisting of National Institute of Standards and Technology (NIST), Payment Card Industry (PCI), and International Organization for Standardization (ISO).

19. The system of claim 17, wherein the customer profile is in the form of Open Security Controls Assessment Language (OSCAL).

20. The system of claim 17, wherein the compliance posture indicates whether the cloud deployment complies with the security definitions.

* * * * *